United States Patent [19]
Hassick

[11] Patent Number: 5,948,270
[45] Date of Patent: Sep. 7, 1999

[54] METHOD FOR REDUCING TURBIDITY IN LAUNDRY WASTE WATER

[75] Inventor: Denis E. Hassick, Monroeville, Pa.

[73] Assignee: Calgon Corporation, Pittsburgh, Pa.

[21] Appl. No.: 08/609,324

[22] Filed: Mar. 1, 1996

[51] Int. Cl.$^6$ .................................................. C02F 1/56
[52] U.S. Cl. .................... 210/727; 210/705; 210/734; 210/735
[58] Field of Search .................... 210/705, 725, 210/727, 728, 734, 735

[56] References Cited

U.S. PATENT DOCUMENTS

| | | | |
|---|---|---|---|
| 4,108,768 | 8/1978 | Sebelik et al. | 210/705 |
| 4,120,815 | 10/1978 | Raman | 252/241 |
| 4,198,294 | 4/1980 | Deane | 210/705 |
| 4,715,962 | 12/1987 | Bhattacharyya et al. | 210/708 |
| 4,764,365 | 8/1988 | Boothe et al. | 424/81 |
| 4,772,462 | 9/1988 | Boothe et al. | 424/70 |
| 4,797,214 | 1/1989 | Sevier | 210/727 |
| 5,013,456 | 5/1991 | St. John et al. | 210/734 |
| 5,076,937 | 12/1991 | Montgomery | 210/705 |
| 5,374,358 | 12/1994 | Kaniecki et al. | 210/704 |
| 5,433,853 | 7/1995 | Mamone | 210/708 |
| 5,529,696 | 6/1996 | Tibbitts | 210/735 |
| 5,531,905 | 7/1996 | Dobrez et al. | 210/709 |
| 5,624,570 | 4/1997 | Hassick | 210/728 |

FOREIGN PATENT DOCUMENTS 2124301  12/1994  Canada .

*Primary Examiner*—Peter A. Hruskoci
*Attorney, Agent, or Firm*—Diane R. Meyers; Eckert Seamans Cherin & Mellott, LLC

[57] ABSTRACT

A method for reducing turbidity in laundry waste water comprising the steps of treating said water with effective amounts of a first polymer comprised of a dialkyl diallyl ammonium halide containing (meth)acrylic acid moieties and a second anionic, nonionic or cationic acrylamide polymer is disclosed.

7 Claims, No Drawings

METHOD FOR REDUCING TURBIDITY IN LAUNDRY WASTE WATER

BACKGROUND OF THE INVENTION

1. Field of the Invention

The present invention relates to methods for reducing turbidity and/or contamination in laundry waste water by treating the water with an effective amount of a first polymer prepared from a dialkyl diallyl ammonium halide and (meth) acrylic acid and a second copolymer which is either a cationic, nonionic or anionic acrylamide polymer.

2. Description of the Background Art

The character of waste water generated by an industrial laundry is in large part a function of the customer group that the laundry serves. This customer group typically includes a wide variety of industrial and commercial firms including but not limited to heavy manufacturing industries, the electroplating and automotive industries, battery manufacturers, the service industries, newspapers, printers, auto garages, schools, commercial and retail businesses. Because of these diverse customers, a wide variety of contaminants are present in the waste water of a typical laundry. Representative of the contaminants are oils and greases, heavy metals such as lead, cadmium or zinc, suspended solids such as dirt, hydrocarbon solvents, organic materials and others. Waste water from industrial laundries further includes in its complex mixture the soaps and surfactants used for cleaning; it also generally has high Biological Oxygen Demand (BOD), high Chemical Oxygen Demand (COD) and an alkaline pH. The range of constituents, as well as the variability that exists in laundry wastes, makes it a unique waste water to treat. Laundry waste water is also unique in that contaminants enter the waste water not as a result of its intrinsic process or raw materials, but rather as residual materials discharged from the garments, shop towels, and other dust control items used by the laundries' customers.

Discharge of this laundry waste water to a municipal Publicly Owned Treatment Works (POTW) presents a significant problem to commercial laundries that generate large volumes of waste water containing the types of contaminants listed above. A typical industrial laundry has 20,000 to 200,000 gallons per day of discharge water. This can typically represent about 0.2% of the hydraulic load on a municipal treatment plant, yet at the same time represent 15 to 20% of its treatment load. In order to comply with local and federal discharge requirements, it is therefore often necessary to treat laundry waste water prior to discharge of the water to POTW. Typically, such water is treated by adding effective amounts of chemical coagulation and/or flocculation agents, which causes a major part of the colloidally dispersed solids and oils in the water to be transformed together with the coagulants and/or flocculants into an easily separable form, mostly into a non-slimy flocculant deposit. Dissolved air floatation (DAF) is then typically used to separate the flocculant solids from the water phase. Vacuum filtration, pressure filtration or belt press filtration can be used to further dewater the floated solids.

The response of an individual waste water to a polymeric treatment additive is a complex function of the water's physical and chemical composition including, for example, the chemical composition of dispersed solid phases, the types of oils and greases, the average particle size, the size distribution of all dispersed phases, the washing chemicals and their concentrations, the temperature, the pH, etc. Added to this complexity is the presence of microorganisms that change the character of the system with time.

The terms coagulation and flocculation, as used herein, collectively refer to the separation of suspended solid particles from aqueous systems. This generally occurs by neutralizing the charge of the particles (coagulation), followed by agglomeration of the neutralized solids (flocculation).

Turbidity, as used herein, is defined as the cloudiness or haziness of a solution caused by finely suspended particles. Turbidity is measured using nephelometric turbidity units (NTU). As used herein, low turbidity suspensions are those generally having a low solids concentration (on a weight basis), i.e., a solids weight percent of 0.1 or less. This typically corresponds with an approximate turbidity of 50 NTU's or less, but may vary due to the nature of the solids or dissolved colored matter. High solids suspensions include those systems containing in excess of 0.1 weight percent suspended solids, which generally corresponds to a turbidity of greater than 50 NTU's. The present invention, while useful in water of any turbidity, is particularly directed to waters having a high turbidity.

From an ecological and economic viewpoint, the treatment of laundry waste water represents a problem of constantly increasing importance, and numerous methods of treating this waste water are reported. For example, U.S. Pat. No. 5,076,937 describes a method for removing impurities such as the oil and grease associated with a pH activated surfactant from waste water by deactivating the surfactant to cause release of these impurities, infusing a gas into the solution, coalescing the oil and grease droplets with the gas to achieve droplet buoyancy, forming a layer of said droplets atop said solution, removing said layer and adjusting the pH of the solution to about neutral.

U.S. Pat. No. 4,198,294 discloses a method of reclaiming waste water by emulsifying the water with a high molecular weight anionic surface active oil, breaking the emulsion thereby producing a coherent flocculant which occludes the insoluble matter suspended in the water, and separating the flocculant from the purified water.

U.S. Pat. No. 4,108,768 discloses a method of purifying industrial waste waters by adjusting the pH of the water to at least 11.6, adding calcium chloride to flocculate oil or grease in the water, adding a coagulant to agglomerate the flocculant, and removing the flocculant.

None of these methods for laundry waste water purification suggests the methods of the present invention, however.

Other treatments of laundry waste water include treating the water with a cationic polymer, such as poly dimethyl diallyl ammonium chloride (DMDAAC) to de-stabilize the colloidal solids, followed by addition of a high molecular weight anionic or cationic acrylamide copolymer. By contrast, the present invention teaches that using a cationic dialkyl diallyl ammonium halide polymer containing anionic (meth)acrylic acid moieties followed by the addition of a high molecular weight anionic or cationic acrylamide copolymer results in an unexpected reduction of turbidity and contamination in the final settled water. As used herein, the term (meth)acrylic is meant to refer to both methacrylic and acrylic acid compounds. The preferred polymers are prepared from DMDAAC and (meth)acrylic acid.

Copolymers of DMDAAC and (meth)acrylic acid, as well as related compounds, are known. Their use, however, for clarifying laundry waste is not known in the art. For example, U.S. Pat. No. 5,013,456 reports the use of dimethyl diallyl ammonium chloride copolymers with anionic monomers for coagulating de-inking process waters in paper recycling. U.S. Pat. No. 4,715,962 claims a method of removing impurities from a waste oil emulsion selected from the group consisting of a petroleum refinery waste water and an automotive oily effluent water by treating the water with a water soluble polymer of DMDAAC and either (meth)acrylic acid or (meth)acrylic acid and a hydroxy $C_2$–$C_6$ alkyl (meth)acrylate. U.S. Pat. No. 4,120,815 claims a method of breaking oil-in-water emulsions by treating the emulsions with a cationic water-in-oil emulsion polymer prepared by polymerization of various combinations of acrylamide, DMDAAC, acrylic acid and diethyl diallyl ammonium chloride (DEDAAC). U.S. Pat. Nos. 4,764,365 and 4,772,462 disclose the use of DMDAAC and (meth) acrylic acid copolymers in personal skin care products and hair care products, respectively. Canadian patent 2,124,301 discloses a demulsifier comprising a hydrophobic polyelectrolyte copolymer comprising DMDAAC and a hydrophobic monomer. The hydrophobic monomer disclosed in this patent is selected from a group consisting of a quaternized dialkylaminoalkylmethacrylates and alkyl esters of (meth) acrylic acids.

Because of the importance of reducing contamination in laundry waste water prior to discharge, there remains a very real and substantial need for improved methods of treating laundry waste water.

SUMMARY OF THE INVENTION

The present invention generally meets the above need by providing a method for reducing turbidity and/or contamination in laundry waste water comprising treating said water with effective amounts of: a) a first polymer; and b) a second cationic, nonionic or anionic acrylamide polymer, wherein component a) is a prepared using i) a dialkyl diallyl ammonium halide and (ii) (meth)acrylic acid and component b) is a high molecular weight cationic, nonionic or anionic acrylamide polymer.

The polymers used in the methods the present invention improve separation performance and thereby allow the operator of an industrial laundry increased flexibility in operation. These methods achieve improved discharge limits while using less of the expensive cationic polymers currently in use.

DETAILED DESCRIPTION OF THE INVENTION

The present invention is directed to a method for reducing turbidity in laundry waste water comprising treating said water with an effective amount of: a) a first polymer; and b) a second cationic, nonionic or anionic acrylamide polymer, wherein component a) comprises i) about 60 to about 99%, by weight, of a dialkyl diallyl ammonium halide and ii) about 1 to about 40%, by weight, of an anionic monomer selected from the group consisting of acrylic acid and methacrylic acid, and wherein the molecular weight of component a) ranges from about 10,000 to about 3,000,000 and wherein the molecular weight of component b) ranges from 1,000,000 to 15,000,000 as determined by Gel Permeation Chromatography. Other anionic vinyl monomers including maleic acid, itaconic acid and fumaric acid can also be used.

Referring now to component a), the first polymer is preferably prepared using DMDAAC monomer at about 60 to about 99%, based on total polymer weight, while the anionic monomer comprises from about 1 to about 40%, based on total polymer weight. More preferably, the quaternary:anionic weight ratio is from about 99:1 to about 80:20, based on the total weight of the polymer. Thus, in the component a) copolymers of the present invention, the cationic moiety of the polymer is predominant. Additionally, other moieties may be present in the polymer.

An especially suitable polymer is that in which the anionic portion is acrylic acid. Preferably, the DMDAAC:acrylic acid weight ratio ranges from about 99:1 to about 60:40, most preferably from about 99:1 to about 80:20, based on total polymer weight. Products having a DMDAAC:acrylic acid ratio in these ranges are available from Calgon Corporation, Pittsburgh, Pa. as Merquat® 280 and Merquat® 295.

The component a) copolymers used in the methods of the present invention may have any molecular weight ranging from about 10,000 to about 3,000,000 with the preferred molecular weight ranging from about 10,000 to 2,000,000. These polymers may be prepared using conventional free radical polymerization techniques familiar to those skilled in the art.

It is believed that component a) as described above functions to coagulate any suspended solids or dispersed oil which may be present in the laundry waste water. It is further believed that this coagulation takes place through charge neutralization of the solids, though the inventors do not intend to be bound by any mechanism. Further, the enhanced performance experienced with the compositions of this invention may be the result of the hydrogen bonding character of the (meth)acrylic acid groups which provide an additional destabilization mechanism.

It is well known in the art to use one or more flocculants to treat coagulated solids to provide better solids removal. Treatment of the laundry waste water with component a) is therefore followed by treatment with component b), which serves to agglomerate the coagulated solids. A variety of conventional polymeric flocculants can be employed, depending on the laundry waste water being treated. It is preferred that the flocculant used in the methods of the present invention, referred to as component b) above, be an anionic, nonionic or cationic high molecular weight acrylamide polymer. The molecular weight range of component b) is typically between about 1,000,000 and 15,000,000, more preferably between about 2,000,000 and 10,000,000. Such products are commercially available from Calgon Corporation, Nalco and Cytec. Preferred anionic acrylamides are prepared using (meth)acrylic acid and acrylamide. Hydrolyzed polyacrylamides can also be used. Generally, the carboxylic content of the anionic polymers varies from about 10–50% by weight. Preferred cationic polymers are prepared by the polymerization of conventional cationic monomers with acrylamide. The cationic moieties generally comprise up to about 60–70%, based on total polymer weight of such polymers.

After addition of component b), the agglomeration which forms is removed by dissolved air flotation or other means typically used in the art. Coagulation, flocculation and removal of the solids in the laundry waste water results in a reduction in the turbidity and contamination of the water being treated.

As stated above, an effective amount of each component must be added to the laundry waste water being treated. As used herein, the term "effective amount" refers to that amount of each component necessary to achieve the desired reduction in turbidity and/or contamination in the waste water being treated. An effective amount of component a) will typically range from about 1 to about 1,000 parts per million (ppm) based upon the weight of the water being treated, with 10 to 500 ppm being the preferred treatment range. The exact amount of component a) added will depend on how contaminated the water is; the dirtier the water the more of the polymer required to coagulate the solids. An effective amount of component b) will range from about 1 to about 1000 ppm, based upon the weight of the water being treated. Again, the amount of component b) used will depend on how much solid is in the water. The effective amount of component b) will typically increase or decrease with the amount of component a) needed. The amount of both components also depends on the level of reduction of turbidity which is desired. These determinations are well within the ordinary skill of one practicing in the art.

As an example of a best mode embodiment of the present invention, component a), the copolymer coagulant, will preferably be a solution polymer in moderately viscous liquid form. Such solution polymers typically are diluted to about 10% or less upon addition to the laundry waste water being treated, although higher dilutions are within the scope of the invention. An effective amount of the final polymer solution is added. Other products can also be used such as inverse water in oil emulsions or dry solids. The product form selected is a matter of choice depending upon storage and handling considerations and is not believed to effect the performance of the polymer. Addition of component a) to the waste water is preferably at a rapid mix zone, just after equalization. Thorough mixing of component a) with the waste water is believed to be important to ensure adequate reaction between component a) and the waste.

Component b), the acrylamide-based flocculant, is preferably supplied as an emulsion product, although dry products can also be used in the methods of the present invention. The emulsion will typically be used at a working concentration of about 0.5 to about 2.0% active and added at the influent to the DAF unit. As will be appreciated by one skilled in the art, too much agitation or shear may cause the flocculants to break apart thereby making separation more difficult. The optimal addition points for components a) and b) are based on the design of the individual laundry, and are within the skill of one practicing in the art to determine.

EXAMPLES

The following examples are provided to illustrate the invention in greater detail and should not be construed as limiting the invention in any way.

In Examples I–III, jar tests were run on water samples taken from industrial laundries located in Ohio, Massachusetts and Pennsylvania, as indicated below. The jar tests, which will be familiar to one skilled in the art, were run according to H. E. Hudson and E. G. Wagner, *Conduct and Use of Jar Tests*, JAWWA, Vol. 73, No. 4., p. 218 (1981), with the following particulars:

2 minutes at the maximum RPM following addition of the first cationic polymer 3 minutes at 70 RPM following addition of the second anionic polymer 5 minutes at 0 RPM.

After the 5 minutes settling period, 20 ml samples of supernatant were drawn and turbidity was measured using a Spectronic 21 DUV set at 450 microns and using deionized water as the 100% blank. COD analysis was performed using the Hack method, Test No. 5220D of the Standard Methods. The coefficient of variation was about 10%.

The following polymer compositions were used in the examples:

PDMDAAC—Commercially available poly dimethy diallyl ammonium chloride compounds of varying molecular weight (MW).

Polymer A is a copolymer of dimethyl diallyl ammonium chloride (97.7% by weight) and acrylic acid (2.3% by weight) prepared by aqueous solution polymerization techniques. The molecular weight of Polymer A is about 500,000.

Polymer B is a copolymer of dimethyl diallyl ammonium chloride (80% by weight) and acrylic acid (20% by weight) prepared by aqueous solution polymerization techniques. The molecular weight of Polymer B is about 1,000,000.

Example I

Waste water samples from an industrial laundry in Pennsylvania were treated with four commercially available poly dimethyl diallyl ammonium chloride (PDMDAAC) compounds, each with different molecular weights, and compared to Polymer A. The cationic polymer was added first in amounts ranging from 100 to 250 ppm, followed by a high molecular weight anionic polyacrylamide in amounts ranging from 12.5 to 30; the exact amounts of each polymer are shown in Table 1. The commercially available anionic polyacrylamide, which contained about 40% acrylic acid, by weight, 60% acrylamide, by weight, and had a molecular weight of about 6,000,000, was added in incremental amounts to obtain the best transmittance value. The following table shows the % Transmittance/Anionic polymer dose in ppm.

TABLE 1

| | % Transmittance/Anionic Polyacrylamide (ppm) Cationic Polymer Dosage | | | | | |
|---|---|---|---|---|---|---|
| Sample | 100 ppm | 150 ppm | 175 ppm | 200 ppm | 225 ppm | 250 ppm |
| PDMDAAC 35000 M.W. | 0.5/30 | 8.8/30 | 15.1/30 | 43.7/30 | 65.5/25 | 74.4/25 |
| PDMDAAC 94000 M.W. | 1.3/20 | 18.1/20 | 20.2/20 | 50/20 | 68.9/15 | 76.1/15 |
| PDMDAAC 99000 M.W. | 1.4/25 | 11.2/25 | 29.2/25 | 58.2/25 | 67.9/20 | 72.8/20 |
| PDMDAAC 840000 M.W. | 2.1/25 | 20.1/25 | 27.6/25 | 59.3/20 | 70.9/20 | 66.2/20 |
| Polymer A | 20.8/25 | 75.3/12.5 | 82.1/12.5 | 88.7/12.5 | 69/12.5 | 63.8/15 |

Polymer A was superior across the dosage range compared to the conventional polymer treatment (PDMDAAC). A higher % transmittance indicates that more solids were removed from the waste water.

Example II

Example II was run with laundry waste water from the Ohio location. The waste water samples were treated with 150 ppm of ferric chloride followed by 150 ppm of lime. This treatment was followed by the addition of cationic polymer in the amounts indicated in Table 2, and 16 ppm of a commercially available anionic high molecular weight polyacrylamide, containing 30%, by weight, acrylic acid and 70%, by weight, acrylamide.

TABLE 2

| Dose (ppm) | % Transmittance (COD) | |
| --- | --- | --- |
| | PDMDAAC (m.w. 94000) | Polymer A |
| 75 | 48.3 (740) | 78.8 (520) |
| 100 | 42.1 | 72.6 |

Polymer A performed better than the conventional treatment (PDMDAAC) at both cationic polymer dosage levels. The decline in performance at 100 ppm for both polymer treatments illustrates that the optimum dose was exceeded. This is a characteristic behavior of most colloidal systems. The values in parentheses represent the Chemical Oxygen Demand (COD) determined on the supernatant samples; the high residual values indicate the presence of molecular dissolved biodegradable materials which are to be expected in a waste water of this type.

Example III

Example III was run with a laundry waste from the Massachusetts location. The waste water samples were treated with 80 ppm cationic polymer followed by 200 ppm of calcium chloride, which was added to destabilize the colloid. Five ppm of a commercially available anionic polyacrylamide, containing 30%, by weight, acrylic acid and 70%, by weight, acrylamide, were then added to all of the samples.

| Sample | % Transmittance |
| --- | --- |
| PDMDAAC 35000 M.W. | 5.2 |
| PDMDAAC 94000 M.W. | 30.7 |
| PDMDAAC 99000 M.W. | 52.3 |
| PDMDAAC 840000 M.W. | 68.2 |
| Polymer A | 83.2 |
| Polymer B | 10.4 |

Polymer A was more effective than the conventional treatments. Polymer B was more effective than the lowest molecular weight conventional polymer but not as effective as the higher molecular weight polymers.

What is claimed is:

1. A method for reducing turbidity in laundry waste water comprising:

sequentially treating said water with an effective amount of:
   a) a first polymer;
   b) a second anionic acrylamide copolymer having a carboxylic content of 10–50% by weight wherein component a) comprises i) about 60 to about 99%, by weight, of dialkyl diallyl ammonium halide and ii) about 1 to about 40%, by weight, of an anionic monomer selected from the group consisting of acrylic acid and methacrylic acid; wherein the molecular weight of component a) ranges from about 10,000 to about 1,000,000 and wherein the molecular weight of component b) ranges from about 1,000,000 to about 15,000,000 as determined by Gel Permeation Chromatography; and removing the agglomeration which results upon addition of component a) and component b) to reduce turbidity.

2. The method of claim 1 wherein the ratio in component a) of i) to ii) is about 99:1 to about 80:20, based on total copolymer weight.

3. The method of claim 1 wherein the molecular weight of component b) is between about 2,000,000 and 10,000,000.

4. The method of claim 1 wherein said effective amount of component a) is from about 1 to about 1,000 ppm based upon the weight of the water being treated.

5. The method of claim 1 wherein said effective amount of component a) is from about 10 to about 500 ppm based upon the weight of the water being treated.

6. The method of claim 1 wherein said effective amount of component b) is from about 1 to about 1000 ppm based upon the weight of the water being treated.

7. The method of claim 1 wherein the molecular weight of component a) is between about 500,000 and 1,000,000.

* * * * *